Patented Apr. 21, 1936

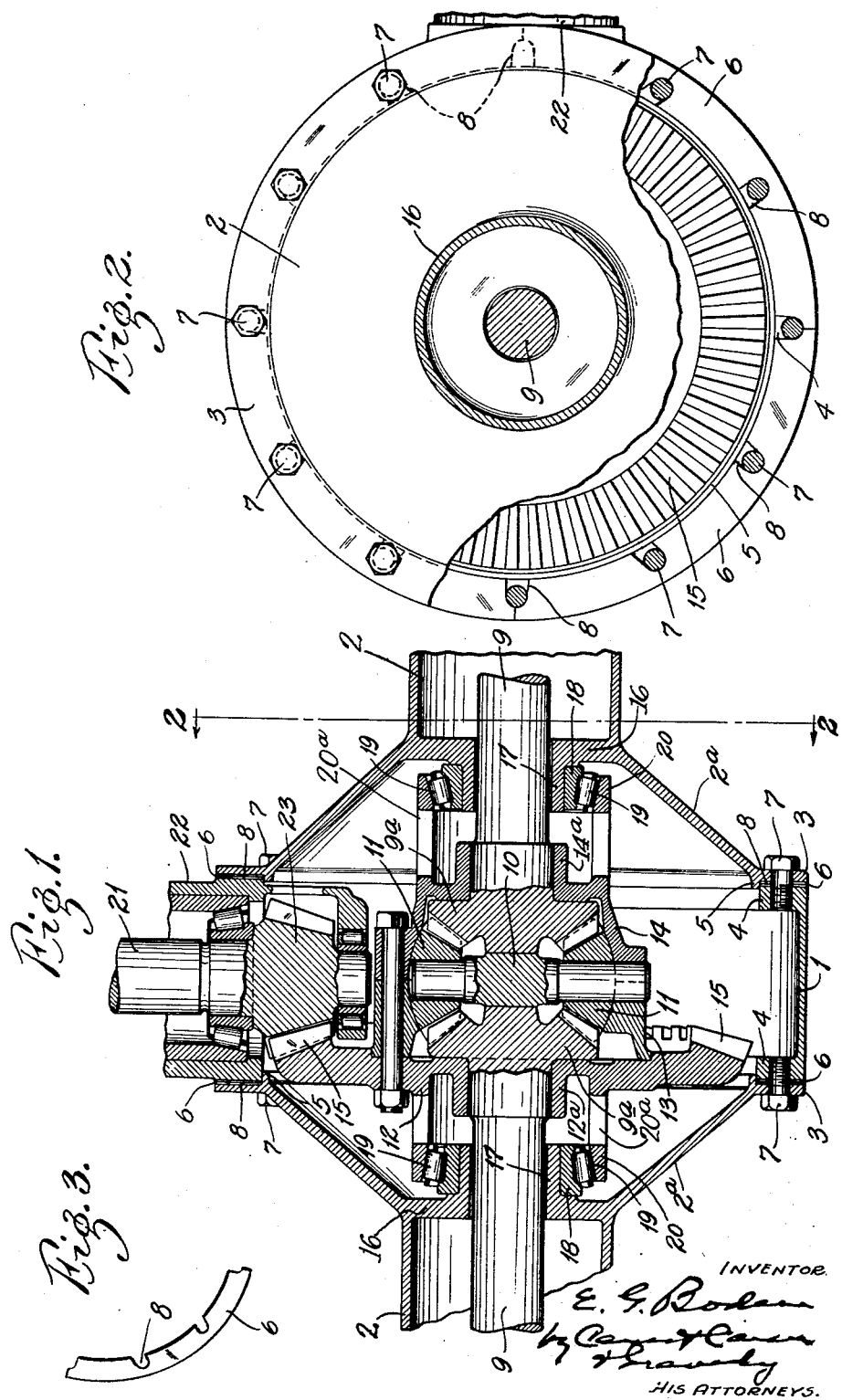

2,037,961

UNITED STATES PATENT OFFICE 2,037,961

AUTOMOTIVE DRIVING AXLE

Ernest G. Boden, Canton, Ohio, assignor to The Timken Roller Bearing Company, Canton, Ohio, a corporation of Ohio Application October 31, 1934, Serial No. 750,790

3 Claims. (Cl. 74—311)

My invention relates to automotive driving axles and particularly to the mounting of the differential mechanism thereof. The principal objects of the invention are to insure the stability of the differential mechanism, provide for the adjustment thereof and provide a strong, simple and economical housing structure. The invention consists principally in mounting the differential mechanism in taper roller bearings that taper toward each other. It also consists in mounting such roller bearings on sleeves that are integral with the end members of the axle housing. It also consists in mounting the outer raceway members of said bearings integral respectively with the side members of the casing of the differential mechanism. It also consists in making the axle housing of a relatively large middle member in which the propeller shaft is mounted and end members secured to said enlarged member with shims interposed between them. It also consists in splitting and notching said shims to enable them to be positioned without completely removing the end member of the housing from the enlarged middle member thereof. It also consists in the parts and in the arrangements and combinations of parts hereinafter described and claimed.

In the accompanying drawing, wherein like numerals refer to like parts wherever they occur, Fig. 1 is a horizontal longitudinal section of an axle construction embodying my invention, portions thereof being broken away, Fig. 2 is a vertical cross-sectional view on the line 2—2 of Fig. 1, part of the axle housing being broken away to show a shim; and Fig. 3 is a detail view of a shim member.

The housing of the present axle comprises a cylindrical or ring-like member 1, channel-shaped in cross-section and large enough in diameter to accommodate the differential mechanism. It also comprises end members 2 of smaller diameter whose inner ends 2a are flared outwardly and terminate in flat rings or flanges 3 opposite the side ribs or flanges 4 of the large middle member of the housing. Annular ribs 5 are formed on the inner faces of the end members of slightly less diameter than the inner diameter of the side flanges 4 of the middle member. The angular recesses thus formed in the end members constitute seats for the sides of the middle member of the housing.

Shims 6 are interposed between the sides of the middle member and the end faces of the end members of the housing; and the end members are secured to the middle member by bolts or cap screws 7 that work in threaded openings provided therefor in the side flanges of said middle member. The shims enable the end members to be adjusted endwise with respect to the middle member. In order to enable such an adjustment to be made without entirely removing the end members from the middle member, the shims are split into arcuate parts, and are provided with deep notches 8 along their inner periphery in proper position and of sufficient width to permit the shim members to be properly positioned while the bolts or screws 7 are still mounted in the middle member but in a slackened position.

The particular differential mechanism illustrated in the accompanying drawing comprises bevel side gears 9a that are integral with the respective axle sections 9 that extend through the tubular end members 2 of the axle housing. The differential mechanism also comprises a spider 10 arranged transversely of the axle sections and provided with bevel gears 11 rotatably mounted thereon and meshing with both side gears. The differential mechanism also comprises a casing in which the spider is mounted. In the particular construction illustrated, this casing comprises three parts, two side members 12, 14 and an intermediate member 13, all suitably bolted together. The side members 12, 14 comprise hubs 12a, 14a for the axle sections and abutments for the side gears of the differential mechanism, and one of the side members 12 is extended radially and provided with bevel gear teeth 15 integral therewith so as to constitute the so-called ring gear of the differential mechanism.

The differential mechanism is mounted on the axle housing as follows: Each of the end members of the axle housing is provided with an annular wall 16 that reaches almost to the axle shaft section and this wall is provided with an annular sleeve 17 that extends towards the enlarged end of the end section of the housing, that is, the sleeve on each end section extends towards the differential mechanism. A cone or inner bearing member 18 for a taper roller bearing is mounted on each of these sleeves with the small ends of the cones facing each other. Suitably caged taper rollers 19 are mounted on said cones and cooperate with cups or outer raceway members 20 which are rigid with and preferably integral with side members of the differential mechanism. Thus, the differential housing members 12 and 14 have inner hub portions 12a, 14a and outer hub portions 20, both of which extend into the flared inner end portions 2a of the end sections 2 of the axle housing. The inner hub members stop short of the sleeves 17 on which the bearing rollers 19 are mounted; and the outer hubs extend beyond the inner hubs and are supported at their ends on said bearing rollers. The outer hubs 20 are provided with perforations 20a adjacent to the portions that cooperate with the bearing rollers, thus permitting oil to reach the bearings from the enlarged portion of the axle housing. As one of the side members of the differential mechanism has the ring gear integral therewith, said side member, ring gear and bearing cup are all made in a single piece. This is feasible because this piece is of a relatively simple design that can be made by die-forging of a material well suited for hardening. It is mainly for this reason that the differential casing is made of three parts instead of having the middle part made integral with the ring gear member.

The propeller shaft 21 is mounted in any suitable way in a nosing 22 formed wholly in the middle member of the axle housing. In the particular construction illustrated, the propeller shaft has a bevel pinion 23 which meshes with the ring gear 15 of the differential mechanism.

By the arrangement hereinbefore described, the ring gear (together with the differential mechanism) may be adjusted longitudinally of the axle housing by removal or addition of shims between either or both of the end members of the axle housing and the middle member thereof. Thus, the proper enmeshment of the pinion with the ring gear of the differential is readily effected and likewise any looseness of the bearings may be taken up. It is noted that the cones or inner raceway members of the bearings are mounted on sleeves that are integral with the end members of the axle housing and that said cones taper towards each other. This arrangement has several advantages. It simplifies the problem of lubrication of the cone by avoiding the centrifugal action that is present when the cone revolves. It enables the thrust of the propeller pinion against the ring gear of the differential mechanism to be transmitted directly to the bearing whose outer raceway member is integral with said ring gear. As the outer raceway members are integral with the side members of the differential casing the mounting of the differential mechanism is quite stable. Another advantage is that said arrangement provides ample space radially of the shaft sections to accommodate sleeves that are thick enough to avoid the tendency to peen and allow the bearing cones to become loose.

What I claim is:

1. An axle construction comprising a housing including a ring-like intermediate section and tubular end sections of smaller diameter having flared inner end portions secured to said intermediate section, said end sections being provided adjacent to their points of flaring with annular end walls having annular sleeves extending towards each other, bearing cones mounted on said annular sleeves with their small ends facing each other, taper rollers on said cones, a differential mechanism casing in said intermediate section and having inner and outer hubs projecting axially from the ends thereof into the flared ends of said end sections, the outer hubs of said differential mechanism casing being supported at their outer ends on the bearing rollers located adjacent thereto and the inner hubs terminating short of the annular cone supporting sleeves on the annular end walls of the end sections, and alined shaft sections in said housing extending through said end walls, the annular cone supporting sleeves thereon and the inner hubs of said differential mechanism casing.

2. An axle construction comprising a housing including a ring-like intermediate section and tubular end sections of smaller diameter having flared inner end portions secured to said intermediate section, said end sections being provided adjacent to their points of flaring with annular end walls having annular sleeves extending towards each other, bearing cones mounted on said annular sleeves with their small ends facing each other, taper rollers on said cones, a differential mechanism casing in said intermediate section and having inner and outer hubs projecting axially from the ends thereof into the flared ends of said end sections, the outer hubs of said differential mechanism casing being supported at their outer ends on the bearing rollers located adjacent thereto and provided adjacent to said rollers with openings communicating with the interior of the intermediate housing section and the inner hubs terminating short of the annular cone supporting sleeves on the annular end walls of the end sections, and alined shaft sections in said housing extending through said end walls, the annular cone supporting sleeves thereon and the inner hubs of said differential mechanism casing.

3. An axle construction comprising a housing including a ring-like intermediate section and tubular end sections of smaller diameter having flared inner end portions secured to said intermediate section, said end sections being provided adjacent to their points of flaring with annular end walls having annular sleeves extending towards each other, bearing cones mounted on said annular sleeves with their small ends facing each other, taper rollers on said cones, a differential mechanism casing in said intermediate section and having inner and outer hubs projecting axially from the ends thereof into the flared ends of said end sections, the outer hubs of said differential mechanism casing being supported at their outer ends on the bearing rollers located adjacent thereto and the inner hubs terminating short of the annular cone supporting sleeves on the annular end walls of the end sections, alined shaft sections in said housing extending through said end walls, the annular cone supporting sleeves thereon and the inner hubs of said differential mechanism casing, fasteners for detachably securing one of the end sections of said housing to the intermediate section thereof, and a shim split into arcuate sections and interposed between said intermediate section and said detachable end section, said shim having notches therein adapted to accommodate said fasteners and shaped and arranged to permit the shim to be inserted in and removed laterally from said housing without disengaging said fasteners from said intermediate section.

ERNEST G. BODEN.